Nov. 9, 1954     H. W. ANDERSON     2,693,648
GEOGRAPHICAL LOCATION FINDER
Filed Feb. 2, 1952     4 Sheets-Sheet 1
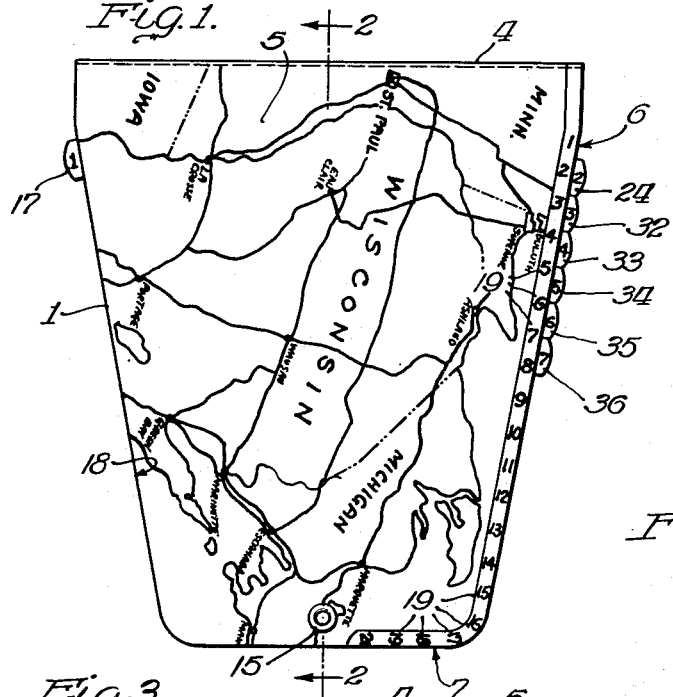
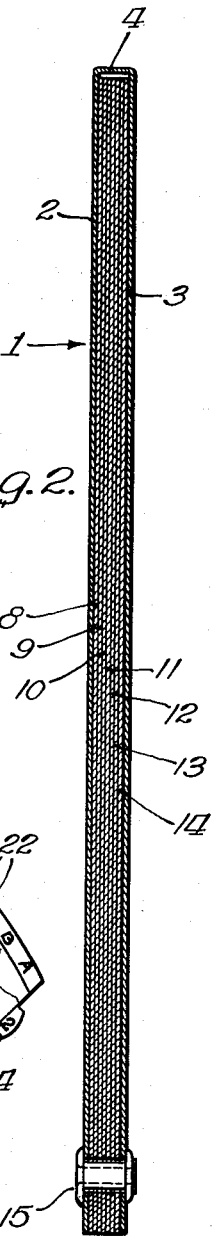
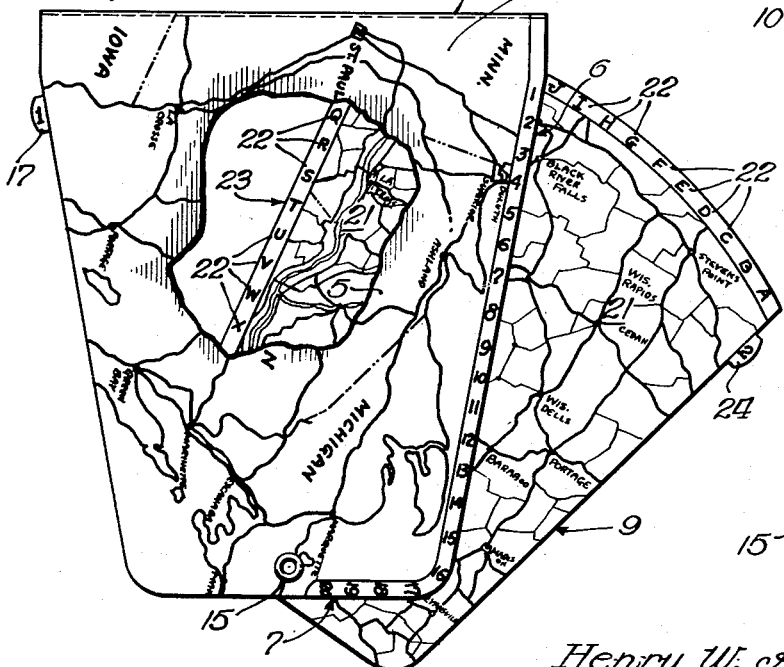
INVENTOR.
Henry W. Anderson
BY
Brown, Jackson, Boettcher & Dienner
Attys.

Nov. 9, 1954  H. W. ANDERSON  2,693,648
GEOGRAPHICAL LOCATION FINDER
Filed Feb. 2, 1952  4 Sheets-Sheet 2
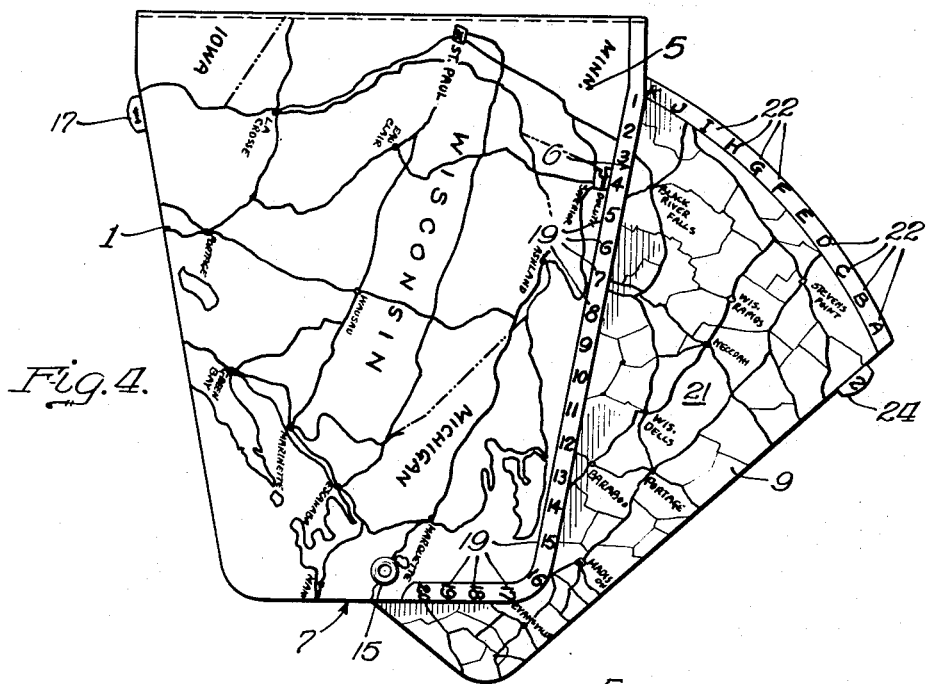
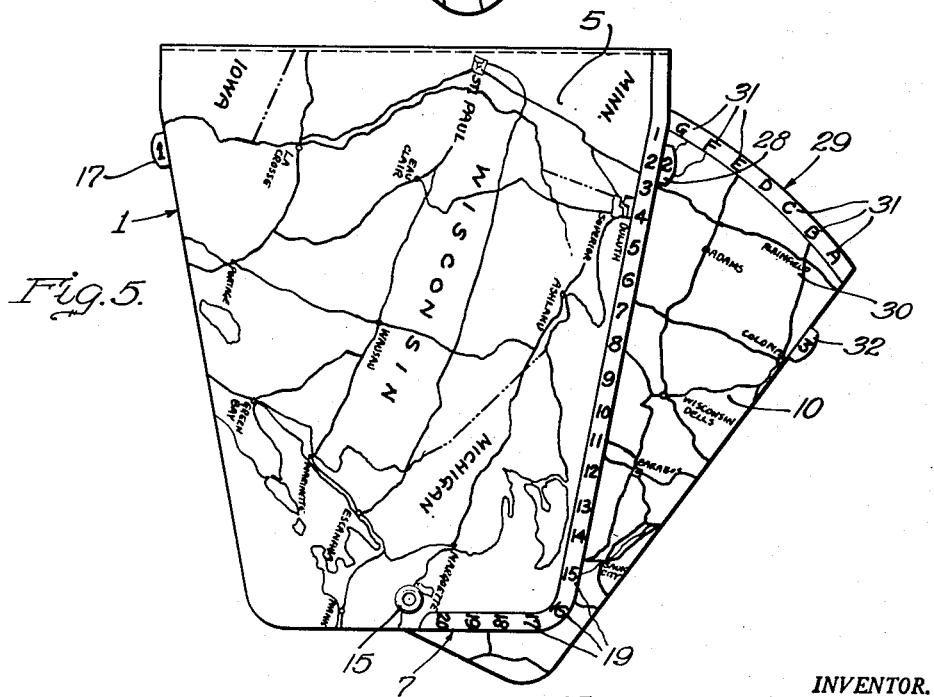
INVENTOR.
Henry W. Anderson
BY

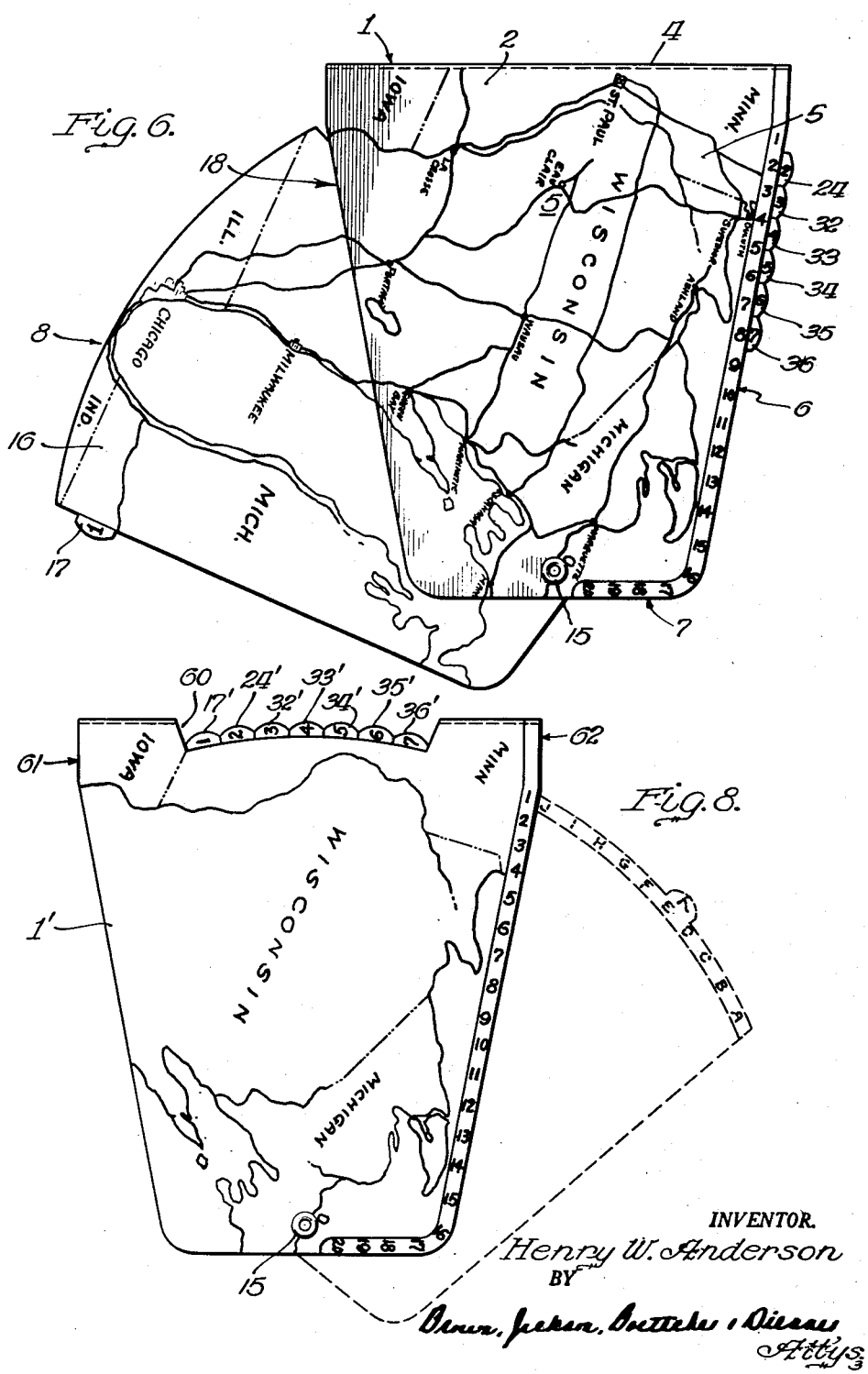

United States Patent Office 2,693,648
Patented Nov. 9, 1954

2,693,648

GEOGRAPHICAL LOCATION FINDER

Henry W. Anderson, Chicago, Ill.

Application February 2, 1952, Serial No. 269,660

8 Claims. (Cl. 35—42)

This invention relates, in general, to computing devices, and has particular relation to a compact device of this character conveniently operable, for example, by a motorist to determine and indicate data pertinent to geographical locations which it is desired to reach.

The present invention in its more limited aspects may be characterized as an improvement on the invention disclosed and claimed in my copending application Serial No. 238,806, filed July 27, 1951.

Road maps as heretofore employed have usually been in the form of a folded sheet which when unfolded exhibits a map of the roads with the cities or other important points indicated therealong. In some cases the sheet has an index thereon and indicia along its marginal edges for locating the desired cities or other points. In using such maps, it has been necessary to unfold them and trace along an imaginary line extended from one edge of the sheet to where it intersects an imaginary line extended from another edge of the sheet to find a general area in which the city or other point is located, it then being necessary to find the city or other point within such general area which heretofore has been of considerable size.

Another disadvantage of these prior folded sheet form of road maps is that the entire area of the map must be on the same scale. If an enlarged scale is desired for a congested area, it has been the practice to provide the sheet with a special section on enlarged scale in addition to the smaller scale showing of such section on the main part of the map. Moreover, these prior folded sheet form of maps are difficult to handle and to trace the desired locations and become worn and torn from frequent handling.

One of the main objects of the present invention is to provide a simple, compact and improved map comprising a cover having indicia along one or more edges thereof and a plurality of leaves each exhibiting a section of the map and having indicia along their edges, the leaves being movable relative to the cover to register their indicia selectively with the indicia bearing edge of the cover and the city or other point being located by the appropriate indicia on the cover as determined by indices on the leaves. The advantage of the foregoing is that the sections of the map on the different leaves may be of different scales, a smaller scale being suitable for less restricted areas and larger scales being desirable to give clearer and greater detail for more restricted areas.

Another object is to provide a cover which exhibits a map section which gives a simplified showing of a portion of the area covered by the map and which cooperates with one or more leaves giving simplified showings of other portions of such area to give when such leaf or leaves are opened or extended a simplified showing of the complete area covered by the map.

Another object is to combine in a simple, compact and advantageous manner the other features herein set forth with the means of my previously identified copending application for computing or ascertaining and indicating the mileage between the different cities or other points appearing on the map.

Another object is to provide a simple, compact and complete package containing a mileage computer, a simplified map, map sections in detail and drawn on different scales, indices, and location finder and which may be conveniently handled without folding or the like.

Further objects and advantages and numerous adaptations of the invention will appear from the following detailed description taken in connection with the accompanying drawings.

In the drawings:

Figure 1 is a front elevational view of one form of device embodying the present invention with the leaves in closed position;

Figure 2 is a detail sectional view on enlarged scale taken on the line 2—2 of Figure 1;

Figure 3 is a front elevational view with one of the map section bearing leaves opened to position with its "J" indicia in register with the cooperating indicia bearing edge of the cover;

Figure 4 is a view similar to Figure 3 with the same map section bearing leaf opened to position with its "K" indicia in register with the cooperating indicia bearing edge of the cover;

Figure 5 is a view similar to Figure 3 with another leaf partially opened and showing fragmentarily its map section on a different scale;

Figure 6 is a view similar to Figure 3 but showing opened from the opposite edge of the cover a sheet bearing a simplified showing of a portion of the area covered by the map and cooperating with a simplified showing on the cover of another portion of such area to give a simplified showing of the complete area covered by the map;

Figure 7:
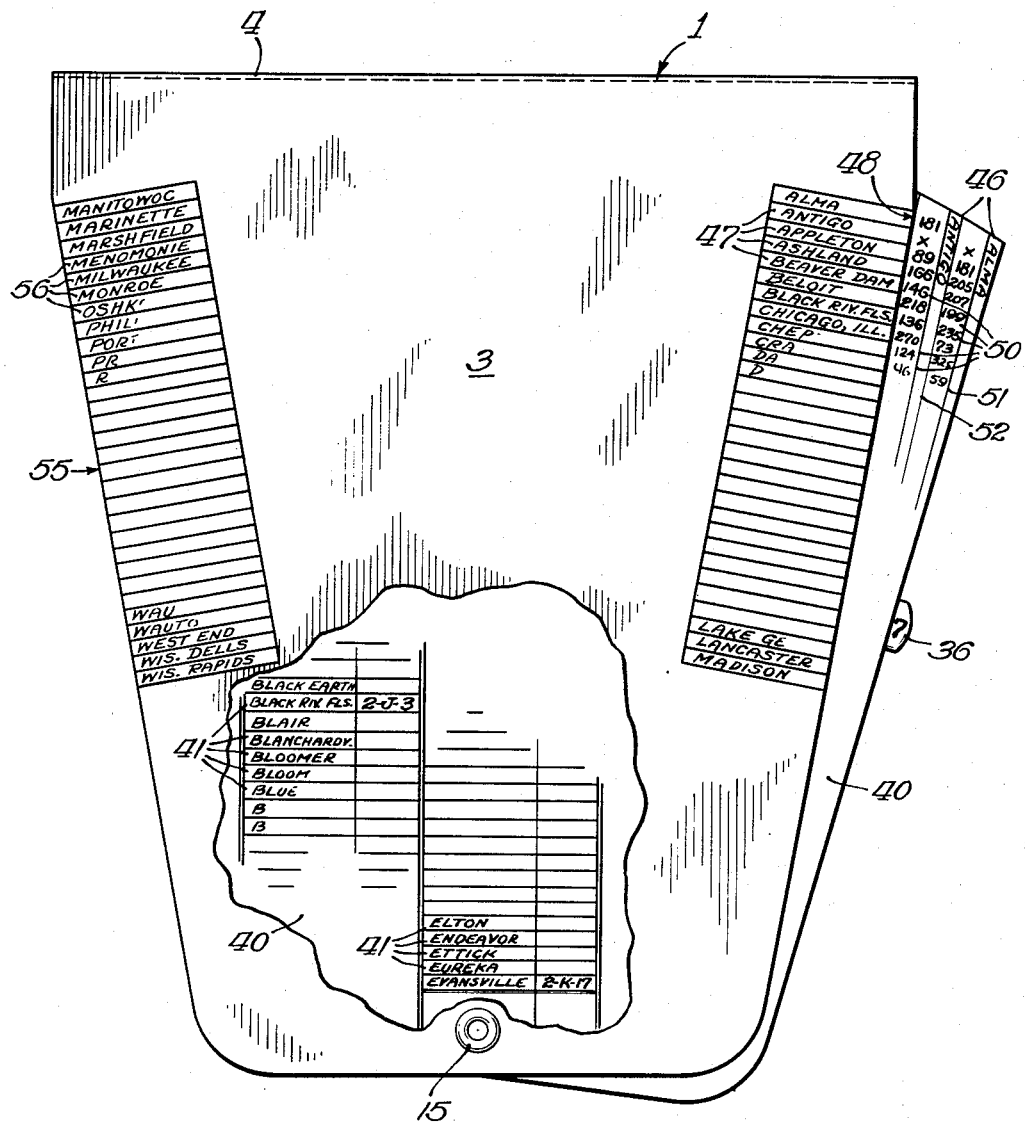

Figure 7 is a rear elevational view of the device with one of the leaves opened to show the mileage computing means and the indices thereon; also the cooperating mileage computing means on the back of the cover, and with the cover partially broken away to show the lists of cities on the back of the leaf and the indexing of same relative to the indicia on the cover and leaves; and Figure 8 is a fragmentary view similar to Figure 1 showing another form of index tabbing for the pivoted leaves of the device.

Referring now to the drawings, the cover 1 is of generally U-shaped form having a pair of sides 2 and 3 joined along their outer edges at 4 as shown in Figure 2.

The front of the cover bears a map section 5 which gives a simplified showing of a portion of the area covered by the map. First indicia 19 in the form of numerals 1–20 extend in equally and relatively closely spaced relation down along the right-hand edge 6 of the front of the cover and in along the lower edge 7 of the front of the cover.

The sides 2 and 3 of the cover are of generally fan or sector-shaped configuration and a plurality of similarly shaped leaves 8, 9, 10, 11, 12, 13 and 14 are pivoted at 15 between the sides 2 and 3 of the cover to be opened and closed relative to the cover by pivotal movement in planes parallel to the sides of the cover. Seven leaves are shown in the illustrative embodiment of the invention but it is to be understood that there may be more or fewer leaves depending upon the area to be covered by the device.

The first leaf 8 from the front of the device bears a map section 16 which gives a simplified showing of a portion of the area covered by the map and which when the leaf 8 is opened or withdrawn to the left to open position as shown in Figure 6 cooperates with the map section 5 on the cover to give a simplified showing of the complete area covered by the device. The map selected for illustration covers the State of Wisconsin and contiguous portions of the States of Illinois, Indiana, Michigan, Minnesota and Iowa. It is to be understood, of course, that the device of the present invention may cover one state, less than one state, more than one state, or other desired areas as suitable or desired. The leaf 8 may have a tab 17 bearing the numeral 1 which tab projects, for example, from the edge 18 of the cover 1 when the leaf 8 is swung to closed position therein. By grasping this tab with the fingers, the leaf 8 may be conveniently withdrawn to open position and returned to position within the cover.

The second leaf 9 (Figure 3) from the front of the device bears a map section 21 which shows on enlarged scale a portion of the area shown in simplified form by the map sections 5 and 16. The front side of the second leaf 9 also bears second indicia 22. These indicia 22 which may be of different character than the indicia 19, for example, in the form of letters of the alphabet as shown in the drawings, are arranged in circumferentially spaced relation along the outer marginal edge of the leaf 9. The indicia 22 may also extend in along one or more side edges of the leaf 9, for example, along the edge 23 as shown in that portion of Figure 3 where the cover is partially broken away. The indicia 19 instead of extending only along the side edge 6 and lower edge 7 of the cover may extend along one or more other edges of the cover and the indicia 22 may extend along one or more other edges of the leaf 9 within the broader aspects of the present invention. The leaf 9 may have a tab 24 bearing the numeral 2 which tab projects, for example, from the edge 6 of the cover when the leaf 9 is swung to closed position therein. As with the leaf 8 and the other leaves, by grasping the tab 24 with the fingers the leaf 9 may be conveniently swung to open position and returned to position within the cover.

Figure 4 shows the second leaf 9 opened to position with indicia K thereon in register with the edge 6 of the cover. Figure 3 shows the second leaf 9 opened to position with indicia J thereon in register with the edge 6 of the cover. The other leaves 10, 11, 12, 13 and 14 may be similarly operable.

The third leaf 10 (Figure 5) from the front of the device bears a map section 30 which shows on an enlarged scale another portion of the area shown in simplified form by the map sections 5 and 16. The enlargement, for example, of the map section 30 enables detailing such map section down to the smallest city or other point desired. The map section 30 is shown on a larger scale than the map section 21 to illustrate how with the device of the present invention the sections of the map on different leaves may be on different scales particularly on smaller scale on one or more leaves for less restricted areas and on enlarged scale on one or more other leaves for more restricted areas. The front side of the leaf 10 bears second indicia 31 similar to the indicia 22. The leaf 10 also has a tab 32 bearing the numeral 3 and functioning as do the other tabs previously described.

The additional leaves not shown in extended or open position have tabs 33, 34, 35 and 36 bearing the numerals 5, 6 and 7. These additional leaves bear map sections showing on an enlarged scale other portions of the area shown in simplified form by the map sections 5 and 16. The number of leaves will vary with the area covered by the device and the number of sections into which such area is broken down and the scale or scales of such sections.

The back or rear surface 40 of the leaf 14 bearing the tab 36 at the broken away portion of the cover in Figure 7 bears listings 41 of the cities or other points on the map preferably in alphabetical order as on the usual folded sheet form of maps. The cities or other points in these listings are followed by index references, for example, and for purposes of illustration, the city Black River Falls in the listing 41 of cities on the back surface 40 is followed by the index reference 2–J–3 and the city Evansville is followed by the index reference 2–K–17.

In locating a city or other point with the device of the present invention, the leaf with the listing of towns including such point is swung to extended position from the cover about the pivot 15. Then in running down the list of cities, for example, to the city or town Black River Falls on the back surface 40 we find the index reference 2–J–3. The 2 refers to the second leaf 9 with the tab 24 bearing the corresponding numeral 2. The tab 24 is then grasped with the fingers and the leaf 9 is swung clockwise (Figure 3) about the pivot 15 until the indicia J on the leaf 9 registers with the edge 6 of the cover. Then by glancing at the indicia 3 on the edge 6 of the cover 1, we have the indexed relation 2–J–3 and there at that location on the map section 21 on the leaf 9 is the city or town Black River Falls.

Similarly, the city or town Evansville in the listing on the back surface 40 is followed by the index reference 2–K–17. This point is located by grasping the tab 24 bearing the numeral 2 and swinging the leaf 9 clockwise (Figure 4) about the pivot 15 until the index K on the leaf 9 registers with the edge 6 of the cover. Then by glancing at the indicia 17 along the lower edge 7 of the cover, we have the indexed relation 2–K–17 and there at that location on the map section 21 on the leaf 9 is the city or town Evansville. It is understood that the roads or routes on the various map sections are marked and numbered corresponding with the various routes as well understood in the art. Thus with the town located the road or roads or routes leading to that town or point are clearly indicated.

With the map divided up into separate sections on separate leaves and the cover operating conjointly therewith, the numerals 1–20 of the first indicia 19 and the letters A–Z of the second indicia 22 and 31 may be spaced relatively close together so that the desired city or other point will be accurately and conveniently located without finding and tracing along imaginary lines and then searching for the city or other point within a relatively large area.

For convenience of illustration all of the cities or points in the listings 41 on the back surface 40 are not shown as followed by index indications but it is to be understood that they will or may be followed by such index indications in actual practice. It is believed that the few index indications shown in the drawings will be sufficient to impart a clear understanding of the present invention. It is to be understood that the listings 41 may be extended to the backs of one or more additional leaves as suitable or desired.

The device of the present invention further embodies an improved combination with the other features of mileage computing means of the form disclosed and claimed in my copending application previously identified herein. For this purpose the back surface 40 having the tab 36 bearing the numeral 7 has a list 46 of cities or other points spaced generally circumferentially along its outer edge for cooperation with a list 47 of cities or other points spaced generally radially along the edge 48 of the cover. The cities of the list 47 are alphabetically listed as are the cities in the list 46. The cities in the list 46 are arranged generally radially and are spaced generally circumferentially. In addition, each leaf provided with a list 46 bears columns 50 of numerical data, for example, the different mileages. These mileages 50 are arranged generally circumferentially and are listed generally radially with one mileage in each list registering with each town in the list 47. The lists of mileages 50 overlap the lists 46 of cities at the outer or wider ends of the leaves, as shown, for example, on the back surface 40. Generally radial lines may be provided at 51 and, if desired, additional generally radial lines may be provided at 52.

By swinging the leaf 14 pivotally relative to the cover 1 to position where the line 52 just counterclockwise (Figure 7) of the mileage list 50 counterclockwise of the town Antigo on the back surface 40 is in register with the edge 48 of the cover, the mileages 50 from Antigo to the towns in the list 47 will be aligned with the towns in such list 47. Thus the distance from Antigo to Alma is indicated as 181 miles and the mileage from Antigo to Ashland is indicated as 166 miles. It will be noted that the mileage place in the mileage list 50 for Antigo which registers with Antigo in the list 46 is left blank. This procedure is followed wherever there is a duplication of towns on the various leaves with towns in the lists on the cover.

The towns in the list 47 along the edge 48 of the cover are continued along the opposite edge 55 of the back of the cover as shown at 56 and other leaves (not shown) having lists of towns corresponding with the list 46 and columns of mileages corresponding with the columns 50 are adapted to be swung counterclockwise (Figure 7) about the pivot 15 to locate other towns in the manner above described. The arrangement of the lists 46 of towns on the backs of the leaves and the mileage columns 50 thereon is such that the lists 46, mileage columns 50 and listings 41 of towns as previously described may be accommodated on the backs of the same leaves.

In the modified form of device shown in Figure 8, the joined outer edges of the sides of the cover 1' are notched circumferentially at 60 between the opposite side edges 61 and 62 of the cover and the tabs 17', 24', 32', 33', 34', 35' and 36' are positioned in the notch when the respective leaves are in closed position within the cover. The tabs 17', 24', 32', and 33'–36' are thus protected and at the same time conveniently accessible for manipulation of the leaves carrying such tabs to open position. It is understood that the tabs 17', 24', 32', and 33'–36' correspond with the tabs 17, 24, 32 and 33–36 of the preceding embodiment of the invention and bear the numerals 1–7 respectively on opposite sides thereof. The numerals in the preceding embodiment of the invention are also preferably on opposite sides of the respective tabs.

If desired the lower ends of the pivoted leaves of the device of the present invention may extend below the lower ends of the sides of the cover. This gives increased areas for map showings below the lower ends of the sides of the cover when the leaves are opened.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

I claim:

1. A geographical location finder comprising, in combination, an outer cover having at least one edge, a leaf pivoted to said cover for pivotal movement from position concealed by said cover to positions exposing different amounts of said leaf from said edge of said cover, said leaf bearing a map section with different geographical locations thereon, a first list of indicia spaced in columnar form extending along said edge of said cover and across the direction of pivotal movement of said leaf with respect to said cover, and a second list of indicia disposed on said leaf in generally arcuate form about said pivot as an axis and extending generally in the direction of pivotal movement of said leaf with respect to said cover, said second indicia being selectively placed in register with said edge of said cover by said pivotal movement of said leaf whereby a geographical location on said map is found by the indexed relation thereby obtained between the indicia on the leaf which is in register with said edge of said cover with the indicia of said first list of indicia.

2. A geographical location finder comprising, in combination, an outer cover having at least one edge, a plurality of leaves each pivoted to said cover on a pivot common to all of said leaves for pivotal movement of each leaf from position concealed by said cover to positions exposing different amounts of each leaf from said edge of said cover, said leaves each bearing a map section with different geographical locations thereon, a first list of indicia spaced in columnar form extending along said edge of said cover and across the direction of pivotal movement of said leaves with respect to said cover, and second lists of indicia one disposed on each leaf in generally arcuate form about said pivot as an axis and extending generally in the direction of pivotal movement of said leaf with respect to said cover, said second indicia being selectively placed in register with said edge of said cover by said pivotal movement of said leaves whereby a geographical location on said map is found by the indexed relation thereby obtained between the indicia on the leaf which is in register with said edge of said cover with the indicia of said first list of indicia.

3. A geographical location finder comprising, in combination, an outer cover having at least one edge, a leaf pivoted to said cover for pivotal movement from position concealed by said cover to positions exposing different amounts of said leaf from said edge of said cover, said leaf bearing a map section with different geographical locations thereon, a first list of indicia spaced in columnar form extending along said edge of said cover and across the direction of pivotal movement of said leaf with respect to said cover, and a second list of indicia disposed on said leaf in generally arcuate form about the outer edge thereof generally in the direction of pivotal movement of said leaf with respect to said cover and continuing along a side edge of said leaf, said second indicia being selectively placed in register with said edge of said cover by said pivotal movement of said leaf whereby a geographical location on said map is found by the indexed relation thereby obtained between the indicia on the leaf which is in register with said edge of said cover with the indicia of said first list of indicia.

4. A geographical location finder comprising, in combination, an outer cover having a first edge and a second edge in angular relation thereto, a leaf pivoted to said cover for pivotal movement from position concealed by said cover to positions exposing different amounts of said leaf from said edges of said cover, said leaf bearing a map section with different geographical locations thereon, a first list of indicia in columnar form extending along said first and second edges of said cover with the portion of said first indicia extending along said first edge extending across the direction of pivotal movement of said leaf with respect to said cover, and a second list of indicia disposed on said leaf in generally arcuate form about said pivot as an axis and extending generally in the direction of pivotal movement of said leaf with respect to said cover, said second indicia being selectively placed in register with said first edge of said cover by said pivotal movement of said leaf whereby a geographical location on said map is found by the indexed relation thereby obtained between the indicia on the leaf which is in register with said edge of said cover with the indicia of said first list of indicia.

5. A geographical location finder comprising, in combination, an outer cover having a first edge and a second edge in angular relation thereto, a leaf pivoted to said cover for pivotal movement from position concealed by said cover to positions exposing different amounts of said leaf from said edges of said cover, said leaf bearing a map section with different geographical locations thereon, a first list of indicia spaced in columnar form extending along said first and second edges of said cover with the portion of said first indicia extending along said first edge of said cover extending across the direction of pivotal movement of said leaf with respect to said cover, and a second list of indicia disposed on said leaf in generally arcuate form about the outer edge thereof generally in the direction of pivotal movement of said leaf with respect to said cover and continuing along a side edge of said leaf, said second indicia being selectively placed in register with said first edge of said cover by said pivotal movement of said leaf whereby a geographical location on said map is found by the indexed relation thereby obtained between the indicia on the leaf which is in register with said first edge of said cover with the indicia of said first list of indicia.

6. A geographical location finder comprising, in combination, an outer cover having at least one edge, a leaf pivoted to said cover for pivotal movement from position concealed by said cover to positions exposing different amounts of said leaf from said edge of said cover, said leaf bearing a map section with different geographical locations thereon, a first list of indicia spaced in columnar form extending along said edge of said cover and across the direction of pivotal movement of said leaf with respect to said cover, a second list of indicia disposed on said leaf in generally arcuate form about said pivot as an axis and extending generally in the direction of pivotal movement of said leaf with respect to said cover, said second indicia being selectively placed in register with said edge of said cover by said pivotal movement of said leaf whereby a geographical location on said map is found by the indexed relation thereby obtained between the indicia on the leaf which is in register with said edge of said cover with the indicia of said first list of indicia, and cooperating mileage indications on back surfaces of said leaf and cover.

7. A geographical location finder comprising, in combination, an outer cover having at least one edge, a leaf pivoted to said cover for pivotal movement from position concealed by said cover to positions exposing different amounts of said leaf from said edge of said cover, said leaf bearing a map section with different geographical locations thereon, a first list of indicia spaced in columnar form extending along said edge of said cover and across the direction of pivotal movement of said leaf with respect to said cover, a second list of indicia disposed on said leaf in generally arcuate form about said pivot as an axis and extending generally in the direction of pivotal movement of said leaf with respect to said cover, said second indicia being selectively placed in register with said edge of said cover by said pivotal movement of said leaf whereby a geographical location on said map is found by the indexed relation thereby obtained between the indicia on the leaf which is in register with said edge of said cover with the indicia of said first list of indicia, said cover bearing on its outer surface a map section giving a simplified showing of a portion of the area covered by said geographical location finder, and a second leaf pivoted to said cover for pivotal movement from position concealed by said cover to exposed position, said second leaf bearing on its outer surface a map section giving a simplified showing of another portion of the area covered by said geographical location finder and which when said leaf is in exposed position cooperates with said simplified showing on the outer surface of said cover to give a simplified showing of the complete area covered by said geographical location finder.

8. A geographical location finder comprising, in combination, an outer cover having front and back sides connected together along their outer edges, said cover having at least one edge, a plurality of leaves pivoted between the front and back sides of said cover on a pivot common to all of said leaves for pivotal movement of each leaf from position concealed by said cover to positions exposing different amounts of each leaf from said edge of said cover, said leaves each bearing a map section with different geographical locations thereon, a first list of indicia spaced in columnar form extending along said edge of said cover and across the direction of pivotal movement of said leaves with respect to said cover, and second lists of indicia one disposed on each leaf in generally arcuate form about said pivot as an axis and extending generally in the direction of pivotal movement of said leaf with respect to said cover, said second indicia being selectively placed in register with said edge of said cover by pivotal movement of said leaves whereby a geographical location on said map is found by the indexed relation thereby obtained between the indicia on the leaf which is in register with said edge of said cover with the indicia of said first list of indicia.

References Cited in the file of this patent

UNITED STATES PATENTS

| Number | Name | Date |
| --- | --- | --- |
| 100,994 | Fitch et al. | Mar. 22, 1870 |
| 1,528,944 | Newell | Mar. 10, 1925 |
| 1,587,506 | Charlton | June 8, 1926 |
| 1,621,686 | Raschick | Mar. 22, 1927 |
| 1,941,777 | Amos | Jan. 2, 1934 |